United States Patent
Choi et al.

(10) Patent No.: US 10,991,951 B2
(45) Date of Patent: Apr. 27, 2021

(54) CATHODE, METAL-AIR BATTERY INCLUDING THE CATHODE, AND METHOD OF MANUFACTURING THE CATHODE

(71) Applicant: SAMSUNG ELECTRONICS CO., LTD., Suwon-si (KR)

(72) Inventors: Wonsung Choi, Seoul (KR); Hyunjin Kim, Seoul (KR); Kyounghwan Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/846,565

(22) Filed: Apr. 13, 2020

(65) Prior Publication Data

US 2021/0091387 A1   Mar. 25, 2021

(30) Foreign Application Priority Data

Sep. 23, 2019   (KR) .................. 10-2019-0116874

(51) Int. Cl.
| | |
|---|---|
| H01M 4/02 | (2006.01) |
| H01M 4/90 | (2006.01) |
| H01M 12/08 | (2006.01) |
| H01M 12/02 | (2006.01) |
| H01M 4/88 | (2006.01) |
| H01M 4/86 | (2006.01) |

(52) U.S. Cl.
CPC ....... *H01M 4/9016* (2013.01); *H01M 4/8663* (2013.01); *H01M 4/8807* (2013.01); *H01M 4/9075* (2013.01); *H01M 12/02* (2013.01); *H01M 12/08* (2013.01); *H01M 2004/8689* (2013.01); *H01M 2300/0005* (2013.01); *H01M 2300/0068* (2013.01)

(58) Field of Classification Search
CPC ...................................................... H01M 4/02
See application file for complete search history.

(56) References Cited

U.S. PATENT DOCUMENTS

| | | | |
|---|---|---|---|
| 2012/0270116 | A1 | 10/2012 | Cho et al. |
| 2016/0204490 | A1 | 7/2016 | Scott |
| 2019/0326591 | A1* | 10/2019 | Feridun .................. C01D 15/08 |

FOREIGN PATENT DOCUMENTS

| | | |
|---|---|---|
| JP | 5354580 B2 | 11/2013 |
| KR | 1020120119228 A | 10/2012 |

OTHER PUBLICATIONS

Kensuke Takechi et al., "A Li—O2/CO2 battery," Chem. Commun., Feb. 9, 2011, pp. 3463-3465, vol. 47.

* cited by examiner

*Primary Examiner* — Jacob B Marks
(74) *Attorney, Agent, or Firm* — Cantor Colburn LLP (57) ABSTRACT

A cathode including a metal carbonate and an aqueous electrolyte material on the metal carbonate.

15 Claims, 8 Drawing Sheets

CATHODE, METAL-AIR BATTERY INCLUDING THE CATHODE, AND METHOD OF MANUFACTURING THE CATHODE

CROSS-REFERENCE TO RELATED APPLICATION

This application claims priority to and the benefit of Korean Patent Application No. 10-2019-0116874, filed on Sep. 23, 2019, in the Korean Intellectual Property Office, and all the benefits accruing therefrom under 35 U.S.C. § 119, the content of which in its entirety is herein incorporated by reference.

BACKGROUND

1. Field

The present disclosure relates to secondary batteries, and more particularly, to cathodes and metal-air batteries including the cathodes and methods of manufacturing the cathodes.

2. Description of Related Art

A metal-air battery may include an anode capable of occluding and releasing ions and a cathode that uses air as an active material. The metal-air battery may use the metal itself as an anode and may not need to store air, which is a cathode active material, in the battery, thereby enabling a high capacity battery. Theoretical energy density per unit weight of a metal-air battery may be high, that is, above 3,500 watt-hours per kilogram (Wh/kg), which corresponds to approximately 10 times that of a lithium ion battery.

A cathode of a metal-air battery may be prepared by mixing a carbon-based conductive material, an organic electrolyte, and the like. When a carbon-based conductive material and an organic electrolyte are used, lithium carbonate ($Li_2CO_3$) may be generated due to oxidation of the carbon-based conductive material, and thus, the lifetime of a metal-air battery may be decreased by an irreversible reaction in which lithium carbonate ($Li_2CO_3$) may be decomposed.

The capacity or performance of a metal-air battery may be significantly influenced by, for example, the material and configuration of the cathode (air electrode). Also, chemical deterioration and deformation of cells by a reaction product of the metal-air battery may act as a factor for decreasing the performance and lifetime of the metal-air battery.

SUMMARY

Additional aspects will be set forth in part in the description which follows and, in part, will be apparent from the description, or may be learned by practice of the presented embodiments of the disclosure.

According to an aspect of an embodiment, a cathode includes a metal carbonate and an aqueous electrolyte material on the metal carbonate.

The metal carbonate may include at least one of $Li_2CO_3$, $Na_2CO_3$, or $K_2CO_3$.

The aqueous electrolyte material may include at least one of $NH_4Cl$, $LiCl$, $Li_2SO_4$, $LiOH$, or a C1 to C9 alkylammonium chloride.

The cathode may further include a cathode support, the metal carbonate being between the aqueous electrolyte material and the cathode support.

2

The cathode support may include at least one of carbon, a metal oxide, or an electron conductor containing a metal.

According to an aspect of an embodiment, a metal-air battery includes an anode portion including a metal, a separator disposed on the anode portion, and a cathode portion disposed on the separator, the cathode portion including an aqueous electrolyte material and a metal carbonate.

The separator may include a solid electrolyte.

The solid electrolyte may include a lithium ion conductive glass, a crystalline lithium ion conductor (ceramic or glass-ceramic), or a combination thereof.

The solid electrolyte may include at least one of lithium-aluminum-germanium-phosphate ("LAGP"), lithium-aluminum-titanium-phosphate ("LATP"), or lithium-aluminum-titanium-silicon-phosphate ("LATSP").

The cathode portion may be an electrode that does not include an organic electrolyte.

The metal-air battery may further include a gas diffusion layer on a surface of the cathode portion.

The metal carbonate may include at least one of $Li_2CO_3$, $Na_2CO_3$, or $K_2CO_3$.

The aqueous electrolyte material may include at least one of $NH_4Cl$, $LiCl$, $Li_2SO_4$, $LiOH$, or a C1 to C9 alkylammonium chloride.

The metal-air battery may further include a cathode support, the metal carbonate being between the aqueous electrolyte material and the cathode support.

The cathode support may include at least one of carbon, a metal oxide, or an electron conductor containing a metal.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"Approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "approximately" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a metal-air battery according to embodiments will be described in detail with reference to the accompanying drawings. Widths and thicknesses of layers or regions shown in the drawings may be exaggerated for clarity and convenience of description. Like reference numbers refer to like elements throughout.

Figure 1:
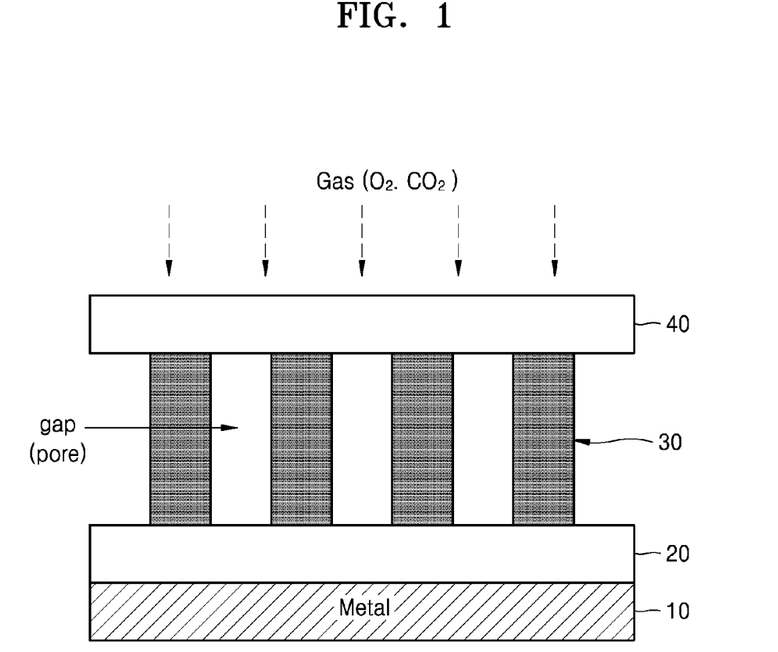
FIG. 1 is a schematic cross-sectional view of a metal-air battery according to an embodiment.
Figure 2:
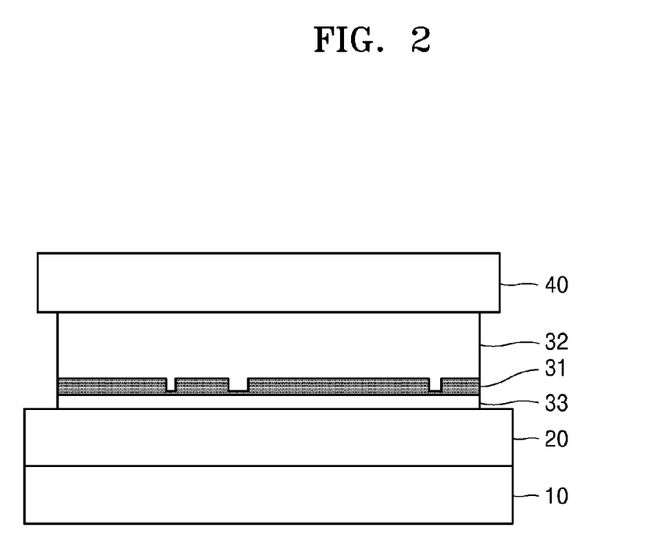
FIG. 2 is an enlarged schematic cross-sectional view for explaining a metal-air battery according to an embodiment.

FIG. 1 is a schematic cross-sectional view of a metal-air battery according to an embodiment. FIG. 2 is an enlarged schematic cross-sectional view for explaining the metal-air battery according to an embodiment.

Referring to FIGS. 1 and 2, the metal-air battery may include an anode layer 10 including a metal and a cathode layer 30 separated from the anode layer 10. The cathode layer 30 may include a metal carbonate 31 and an aqueous electrolyte material 32 as a cathode electrolyte material, e.g., on or directly on the metal carbonate 31. The cathode layer 30 will be described in detail later. A separator 20 may be provided between the anode layer 10 and the cathode layer 30. The metal-air battery may further include a gas diffusion layer 40 in contact with a, e.g., at least one, surface of the cathode layer 30. The gas diffusion layer 40 may smoothly supply oxygen ($O_2$) and carbon dioxide ($CO_2$) to the cathode layer 30. The cathode layer 30 may be a 'cathode catalyst layer' or may be simply referred to as a 'cathode'. It may be stated that the cathode layer 30 and the gas diffusion layer 40 constitute one 'cathode portion'. In other words, the cathode portion of the metal-air battery may include the cathode layer 30 and, optionally, may further include the gas diffusion layer 40.

The anode layer 10 may include a material capable of absorbing and releasing metal ions. The material may include, for example, lithium (Li), copper (Cu), sodium (Na), zinc (Zn), potassium (K), calcium (Ca), magnesium (Mg), iron (Fe), aluminum (Al), or an alloy including, e.g., consisting of, two or more thereof. For example, the anode layer 10 may include lithium (Li). In this case, the anode layer 10 may include at least one of lithium, a lithium-based alloy, or a lithium intercalating compound. When the anode layer 10 includes lithium, the metal-air battery according to an embodiment may be referred to as a 'lithium-air battery'.

As described above, the cathode layer 30 may include a metal carbonate 31 and an aqueous electrolyte material 32. As an example, the metal carbonate 31 may include at least one of $Li_2CO_3$, $Na_2CO_3$, or $K_2CO_3$, but is not limited thereto.

Also, the aqueous electrolyte material 32 may include at least one of $NH_4Cl$, $LiCl$, $Li_2SO_4$, $LiOH$, or a C1 to C9 alkylammonium chloride, e.g., methylammonium chloride.

When the metal-air battery according to an embodiment is a lithium-air battery, the following electrochemical reaction may occur in the cathode portion during discharge.

$$4Li^+_{(dis.)} + O_{2(dis.)} + \ldots + 2CO_{2(dis.)} + 4e^- \rightarrow 2Li_2CO_{3(solid)}$$

Lithium ions (Li$^+$) provided from the anode layer 10 and oxygen (O$_2$) and carbon dioxide (CO$_2$) provided from the atmosphere (air) combine (react) with electrons (e$^-$) at the surface of the cathode layer 30, and thus, lithium carbonate (Li$_2$CO$_3$) may be produced. Lithium carbonate (Li$_2$CO$_3$) produced here may be regarded as an example of a reaction product.

When the metal-air battery according to an embodiment is a lithium-air battery, the following electrochemical reaction may occur in the positive electrode portion during charge.

$$2Li_2CO_{3(dis.)} + 2H_2O_{(dis.)} \rightarrow 4LiOH_{(dis.)} + 2CO_{2(dis.)}$$

Hydrogen ions (H$^+$) provided from the aqueous electrolyte material 32 may be used to promote the decomposition of lithium carbonate (Li$_2$CO$_3$), thereby decreasing an overvoltage during a charge and decreasing a charging voltage of the metal-air battery.

In addition, during charge, the following electrochemical reaction may occur in the aqueous electrolyte material 32.

$$4LiOH_{(dis.)} \rightarrow 4Li^+_{(dis.)} + 2H_2O_{(dis.)} + O_{2(dis.)} + 4e^-$$

Lithium hydroxide (LOH) generated in the cathode portion may be decomposed into lithium ions (Li+), water (H$_2$O), and oxygen (O$_2$), and thus, a reverse reaction of the discharge reaction may proceed. As described above, when the aqueous electrolyte material 32 is used as a cathode electrolyte material, an irreversible reaction in which lithium carbonate (Li$_2$CO$_3$) may be decomposed during a charge may be more easily performed. Accordingly, an overvoltage decreases and a charging voltage of the metal-air battery is decreased during a charge, and thus, the lifetime of the metal-air battery may be increased.

The cathode layer 30 according to an embodiment may further include a cathode support 33 capable of supporting the metal carbonate 31, e.g., the metal carbonate 31 may be between the aqueous electrolyte material 32 and the cathode support 33. As an example, the cathode support 33 may include at least one of platinum (Pt), ruthenium oxide (RuO$_2$), ruthenium, gold, or carbon.

The separator 20 may include an ion conductive material to enable conduction of ions between the anode layer 10 and the cathode layer 30. The separator 20 may include a solid electrolyte. As an example, the solid electrolyte may include a lithium ion conductive glass, a lithium ion conductive crystal, e.g., a crystalline lithium ion conductor (ceramic, glass-ceramic, or a combination thereof), or a combination thereof. For example, the lithium ion conductive crystal may be, for example, a crystal having a Perovskite structure having a lithium ion conductivity, such as Li$_3$N, a lithium superionic conductor ("LISICON"), La$_{0.55}$Li$_{0.35}$TiO$_3$, LiTi$_2$P$_3$O$_{12}$ having a sodium superionic conductor ('NASICON") structure, or glass-ceramic that precipitates the above crystals. The lithium ion conductive crystal may be, for example, Li$_{1+x+y}$(Al, Ga)$_x$(Ti, Ge)$_{2-x}$Si$_{3-y}$P$_{3-y}$O$_{12}$ (here, 0≤x≤1 and 0≤y≤1, for example, 0≤x≤0.4 and 0<y≤0.6, or 0.1≤x≤0.3 and 0.1<y≤0.4). Lithium ion conductive glass-ceramic may include, for example, lithium-aluminum-germanium-phosphate ("LAGP"), lithium-aluminum-titanium-phosphate ("LATP"), lithium-aluminum-titanium-silicone-phosphate ("LATSP"), etc.

The gas diffusion layer 40 may absorb oxygen and carbon dioxide in the atmosphere and provide them to the cathode layer 30. To do so, the gas diffusion layer 40 may have a porous structure to smoothly diffuse oxygen and carbon dioxide. For example, the gas diffusion layer 40 may be formed by using carbon paper, carbon cloth, or carbon felt that use carbon fiber or a sponge-like foam metal, or a metal fiber mat. Also, the gas diffusion layer 40 may include a flexible porous material having a non-conductive property, such as a nonwoven fabric. However, the cathode layer 30 may include a porous structure etc. so as to perform the role of the gas diffusion layer. In this case, the gas diffusion layer 40 may be omitted.

Although not shown in FIG. 1, an anode current collector in contact with the anode layer 10 may be further provided. The anode current collector may be provided on a bottom surface of the anode layer 10. Therefore, the anode layer 10 may be disposed between the anode current collector and the separator 20. The anode current collector may include, for example, copper (Cu), stainless steel ("SUS"), silver (Ag), magnesium (Mg), or other conductors. Also, a cathode electrode current collector in contact with the gas diffusion layer 40 may be further provided. The cathode current collector may be provided on an upper surface of the gas diffusion layer 40. Accordingly, the gas diffusion layer 40 may be disposed between the cathode current collector and the cathode layer 30. The cathode current collector may include, for example, stainless steel ("SUS") or a porous carbon material. In this case, the SUS of the cathode current collector may have a mesh structure for permeation of air (gas). A material of the cathode current collector is not limited to stainless steel ("SUS"), and may be variously changed. When the gas diffusion layer 40 is omitted, the cathode current collector may contact the cathode layer 30. The anode current collector may be considered as a part of the anode portion, and similarly, the cathode current collector may be considered as a part of the cathode portion.

Figure 3:
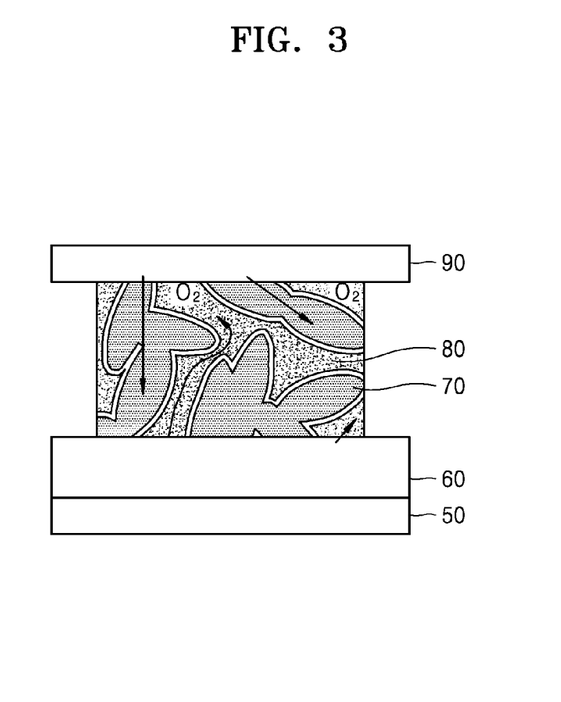
FIG. 3 is a cross-sectional view of a metal-air battery according to a comparative embodiment.

FIG. 3 is a cross-sectional view of a metal-air battery.

Referring to FIG. 3, a separator 60 is provided on an anode layer 50, and a porous cathode layer 70 including a metal carbon salt material is provided between the separator 60 and a gas diffusion layer 90. A cathode electrolyte material 80 is impregnated in pores of the porous cathode layer 70. The cathode electrolyte material 80 may be an organic electrolyte. The porous cathode layer 70 may perform as an electron conductor, and the cathode electrolyte material 80 may perform as an ion conductor. That is, electrons (e$^-$) move through the porous cathode layer 70, and lithium ions (Li$^+$) move through the cathode electrolyte material 80. Oxygen, carbon dioxide, and lithium ions react with the electrons on a surface of the porous cathode layer 70, and thus, lithium oxide, for example, lithium carbonate, is generated. The pores of the porous cathode layer 70 provide spaces for locating lithium oxide which is a reaction product. However, since the decomposition process of the lithium oxide (that is, Li$_2$CO$_3$), which is a reaction product, is an irreversible process, an overvoltage may occur during a charge, and as a result, a battery may rapidly deteriorate. The deterioration of the battery may act as a factor decreasing the performance and shortening the battery life.

However, since the metal-air battery according to an embodiment may promote the decomposition of lithium oxide by using an aqueous electrolyte material as a cathode electrolyte material, the overvoltage problem that may be caused by lithium oxide during a charge may be fundamentally prevented or decreased. Accordingly, use of an aqueous electrolyte material as a cathode electrolyte material may be advantageous for improving/maintaining and increasing the lifetime of a battery.

Figure 4:
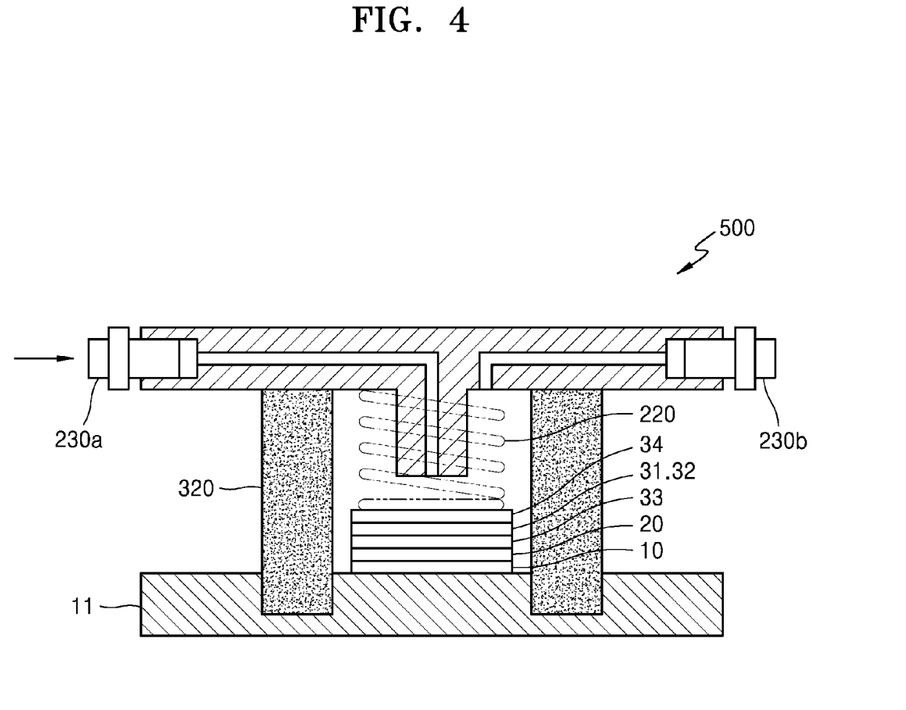
FIG. 4 is a schematic cross-sectional view of a structure of a lithium air battery according to an embodiment.
Figure 5:
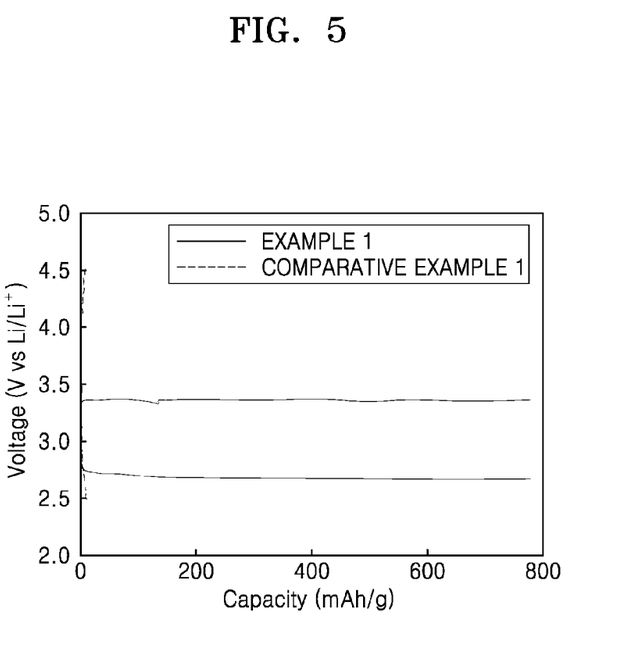
FIG. 5 is a graph of voltage (V vs Li/Li+) versus capacity (milliampere hours per gram (mAh/g)) showing results of measuring the charge and discharge characteristics of a metal-air battery having a structure according to Example 1 and Comparative Example 1.
Figure 6:
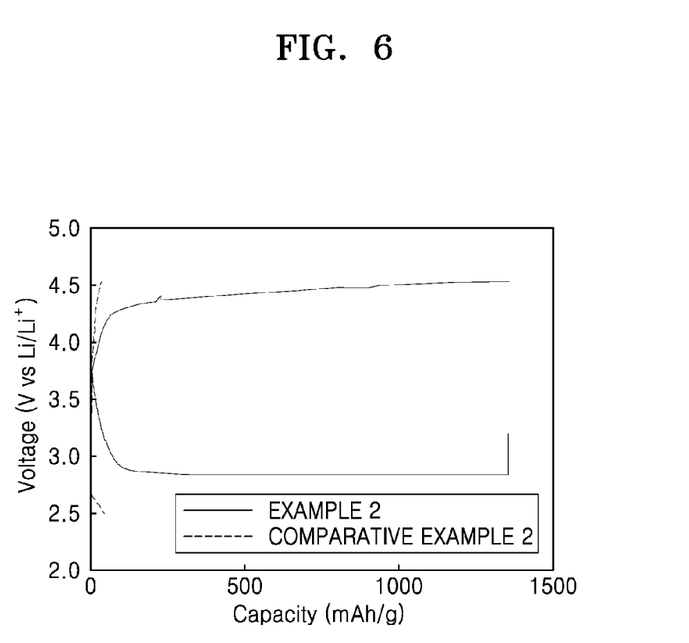
FIG. 6 is a graph of voltage (V vs Li/Li+) versus capacity (mAh/g) showing results of measuring the charge and discharge characteristics of a metal-air battery having a structure according to Example 2 and Comparative Example 2.

FIG. 4 is a schematic cross-sectional view of a structure of a lithium air battery according to an embodiment. FIG. 5 is a graph showing results of measuring the charge and discharge characteristics of a metal-air battery having a structure according to Example 1 and Comparative Example 1. FIG. 6 is a graph showing results of measuring the charge and discharge characteristics of a metal-air battery having a structure according to Example 2 and Comparative Example 2.

In the lithium air battery according to an embodiment, the separator 20 is between the cathode layer 30 adjacent to a cathode current collector 34 and the anode layer 10 including lithium adjacent to an anode current collector 11. The separator 20 is a separator including a solid electrolyte. The metal carbonate 31 in which the aqueous electrolyte material 32 is impregnated may be supported on a cathode support 33. The cathode current collector 34 is porous and may also perform as a gas diffusion layer capable of diffusing air. A pressing member 220 by which air may be delivered to a cathode is disposed on the cathode current collector 34. A case 320 including an insulating resin is between the cathode layer 30 and the anode layer 10 to electrically separate the cathode layer 30 from the anode layer 10. Air is supplied through an air inlet 230a and is discharged through an air outlet 230b. A lithium air battery is not limited to air contained in a stainless steel container, and may include a combination of gases including oxygen and carbon dioxide.

The "air" of a lithium air battery may be atmosphere. The broad definition of the term "air" applies to all applications, for example, air cells, air cathodes, etc.

The present disclosure will be explained in more detail through the following Examples and Comparative Examples. However, Examples are provided herein for illustrative purpose only, and do not limit the scope of the present disclosure.

Manufacture of Lithium Air Battery

Example 1: Manufacture of Lithium Air Battery (Cathode/LATP/PEGDME/Li Anode)

A lithium metal foil as an anode was disposed on a copper thin film, which is an anode current collector, and a polymer electrolyte, which is an anode intermediate layer, was disposed on the anode. The polymer electrolyte is prepared by mixing polyethylene glycol dimethyl ether ("PEGDME") (Mn=500 Dalton, Celgard) and lithium bis (trifluoromethylsulfonyl) imide ("LiTFSI"), which is lithium salt, so that a molar ratio of ethylene oxide ("EO")/Li is 20. A lithium aluminum titanium phosphate ("LATP") film (thickness 180 micrometers (μm), Ohara Glass Corp., Japan), which is a solid electrolyte film, was disposed on the polymer electrolyte.

After dispersing 15 milligrams (mg) of lithium carbonate ($Li_2CO_3$) in 1 milliliter (ml) of ethanol on cathode powder made of platinum (Pt), the resultant product was dried. A cathode was formed by impregnating an aqueous electrolyte material ($H_2O$) into a dried resultant product.

A lithium air battery was formed such that a gas diffusion film (SGL Co., 25BC, gas diffusion layer) is disposed on an upper end the cathode, a nickel mesh is disposed on the gas diffusion film, and a cell is fixed on the nickel mesh by using a pressing member through which air may be delivered to the cathode.

Example 2

A lithium air battery was manufactured in the same manner as in Example 1, except that the cathode support was used as a ruthenium oxide ($RuO_2$) material.

Comparative Example 1

A lithium air battery was formed by using the same method as Example 1 except that 15 mg of lithium carbonate ($Li_2CO_3$) was dispersed in 1 ml of ethanol on a cathode support made of platinum (Pt), and the resultant product was dried, and an organic electrolyte material (1 molar (M) LiTFSI, PEGDME) is impregnated into the dried resultant product.

Comparative Example 2

A lithium air battery was formed by using the same method as the Example 2 except that 15 mg of lithium carbonate ($Li_2CO_3$) was dispersed in 1 ml of ethanol on a cathode support made of ruthenium oxide ($RuO_2$), and the resultant product was dried and an organic electrolyte material (1 M LiTFSI, PEGDME) is impregnated into the dried resultant product.

Evaluation 1

The charge capacity and overvoltage of the lithium air battery according to Example 1 and 2 and Comparative Examples 1 and 2 are shown in Table 1 below.

TABLE 1

| | cathode support | cathode electrolyte material | charge capacity | overvoltage |
|---|---|---|---|---|
| Example 1 | Pt | $H_2O$ | 770 milliampere hours per gram (mAh/g) | 0.69 volts (V) |
| Example 2 | $RuO_2$ | $H_2O$ | 1330 mAh/g | 1.6 V |
| Comparative Example 1 | Pt | 1 M LiTFSI, PEGDME | 11 mAh/g | >2.0 V |
| Comparative Example 2 | $RuO_2$ | 1 M LiTFSI, PEGDME | 44 mAh/g | >2.0 V |

The lithium air batteries formed in Example 1 and Comparative Example 1 were discharged at 40° C. under 100% relative humidity, oxygen atmosphere, and carbon dioxide, and discharge capacities thereof were measured and shown in FIG. 5. The lithium air batteries formed in Example 2 and Comparative Example 2 were discharged at 40° C. under 100% relative humidity, an oxygen atmosphere, and carbon dioxide, and discharge capacities thereof were measured and shown in FIG. 6.

Referring to FIGS. 5 and 6, it may be seen that the charging capacities of the lithium air batteries according to Comparative Examples 1 and 2 are greatly decreased and the overvoltage is greatly increased as compared with the lithium air batteries according to Example 1 and 2 including an aqueous electrolyte material as a cathode electrolyte material.

Figure 7:
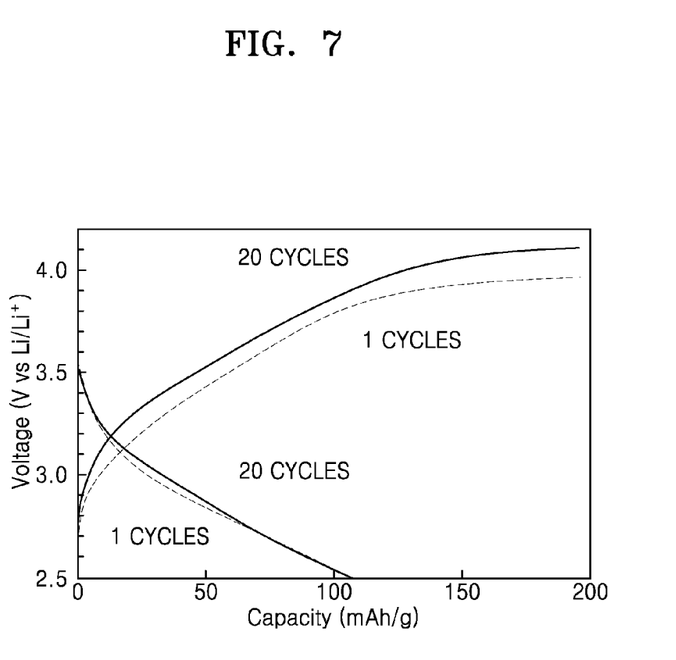
FIG. 7 is a graph of voltage (V vs Li/Li+) versus capacity (mAh/g) showing results of evaluating cyclability by repeatedly performing charge and discharge experiments on a metal-air battery according to an embodiment.
Figure 8:
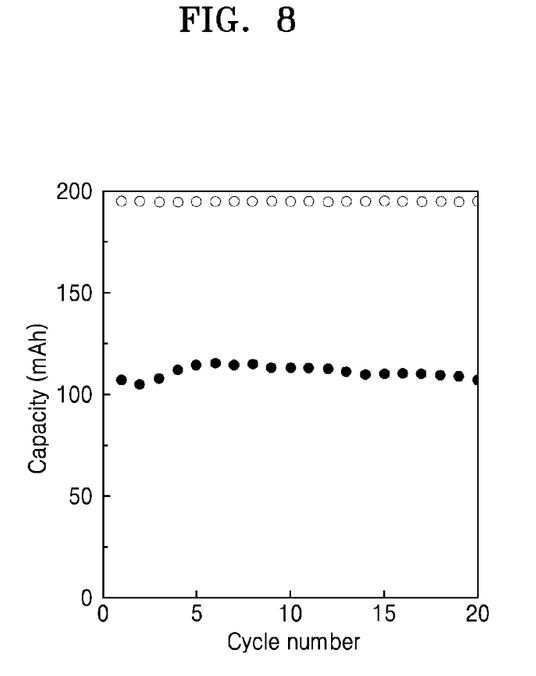
FIG. 8 is a graph of capacity (mAh) versus cycle number showing results of evaluating cyclability by repeatedly performing charge and discharge experiments on a metal-air battery according to an embodiment.

FIGS. 7 and 8 are graphs showing results of evaluating cyclability by repeatedly performing charge and discharge experiments on a metal-air battery according to an embodiment.

Example 3: Manufacture of Lithium Air Battery (Cathode/LATP/PEGDME/Li Anode)

A copper metal foil was disposed as an anode, and a polymer electrolyte, which is an anode intermediate layer, was disposed on the anode. The polymer electrolyte is prepared by mixing PEGDME (Mn=500 Dalton, Celgard) and LiTFSI, which is lithium salt, so that a molar ratio of EO/Li is 20. An LATP film (thickness 260 µm, Ohara Glass Corp., Japan), which is a solid electrolyte film, was disposed on the polymer electrolyte.

After dispersing 15 mg of lithium carbonate ($Li_2CO_3$) in 1 ml of ethanol on cathode powder made of platinum (Pt), and the resultant product was dried. A cathode was formed by impregnating an aqueous electrolyte material ($H_2O$) into the dried resultant product.

A lithium air battery was formed such that a gas diffusion film (SGL Co., 25BC, gas diffusion layer) is disposed on an upper end the cathode, a nickel mesh is disposed on the gas diffusion film, and a cell is fixed on the nickel mesh by using a pressing member through which air may be delivered to the cathode.

The lithium air battery formed in Example 3 was charged and discharged 20 times at 40° C. under 100% relative humidity, an oxygen atmosphere, and carbon dioxide, and charge and discharge capacity thereof was measured and shown in FIGS. 7 and 8.

Referring to FIGS. 7 and 8, the cyclability of the charge and discharge cycle of the metal-air battery according to Example 3 is maintained for 20 times. FIGS. 7 and 8 show the results of the basic experiments, and the cyclability of the charge and discharge cycle may further be improved depending on the configuration of the cathode layer and other conditions.

According to the embodiment described above, a metal-air battery having excellent performance may be realized. A metal-air battery having excellent charge and discharge characteristics may be realized. A metal-air battery that may suppress problems caused by chemical deterioration due to charging and discharging may be realized. A metal-air battery capable of preventing problems caused by organic electrolytes may be realized. A metal-air battery, which is advantageous in terms of ease of processing and manufacturing cost reduction, may be realized.

While many details are set forth in the foregoing description, they should be construed as illustrative of specific embodiments rather than to limit the scope of the invention. For example, it will be understood by those skilled in the art that the structure of the metal-air battery described above may be variously modified Therefore, the scope of the invention concept should not be defined by the embodiments described, but by the technical spirit described in the claims.

What is claimed is:

1. A cathode comprising:
   metal carbonate; and
   an aqueous electrolyte material on the metal carbonate.

2. The cathode of claim 1, wherein the metal carbonate comprises at least one of $Li_2CO_3$, $Na_2CO_3$, or $K_2CO_3$.

3. The cathode of claim 1, wherein the aqueous electrolyte material comprises at least one of $NH_4Cl$, LiCl, $Li_2SO_4$, LiOH, or a C1 to C9 alkylammonium chloride.

4. The cathode of claim 1, further comprising a cathode support, the metal carbonate being between the aqueous electrolyte material and the cathode support.

5. The cathode of claim 4, wherein the cathode support comprises at least one of carbon, a metal oxide, or an electron conductor containing a metal.

6. A metal-air battery comprising:
   an anode portion comprising a metal;
   a separator disposed on the anode portion; and
   a cathode portion disposed on the separator, the cathode portion comprising an aqueous electrolyte material and a metal carbonate.

7. The metal-air battery of claim 6, wherein the separator comprises a solid electrolyte.

8. The metal-air battery of claim 7, wherein the solid electrolyte comprises a lithium ion conductive glass, a crystalline lithium ion conductor, or a combination thereof.

9. The metal-air battery of claim 7, wherein the solid electrolyte comprises
   at least one of lithium-aluminum-germanium-phosphate, lithium-aluminum-titanium-phosphate, or lithium-aluminum-titanium-silicon-phosphate.

10. The metal-air battery of claim 6, wherein the cathode portion is an electrode that does not comprise an organic electrolyte.

11. The metal-air battery of claim 6, further comprising a gas diffusion layer on a surface of the cathode portion.

12. The metal-air battery of claim 6, wherein the metal carbonate comprises at least one of $Li_2CO_3$, $Na_2CO_3$, or $K_2CO_3$.

13. The metal-air battery of claim 6, wherein the aqueous electrolyte material comprises at least one of $NH_4Cl$, LiCl, $Li_2SO_4$, LiOH, or a C1 to C9 alkylammonium chloride.

14. The metal-air battery of claim 6, further comprising a cathode support, the metal carbonate being between the aqueous electrolyte material and the cathode support.

15. The metal-air battery of claim 14, wherein the cathode support comprises at least one of carbon, a metal oxide, or an electron conductor containing a metal.

* * * * *